May 30, 1967 L. J. SLOMINSKI 3,322,673
COMPOSITION FOR AND METHOD OF DISSOLVING COPPER AND COPPER ALLOYS BY CHEMICAL ACTION
Filed April 1, 1964
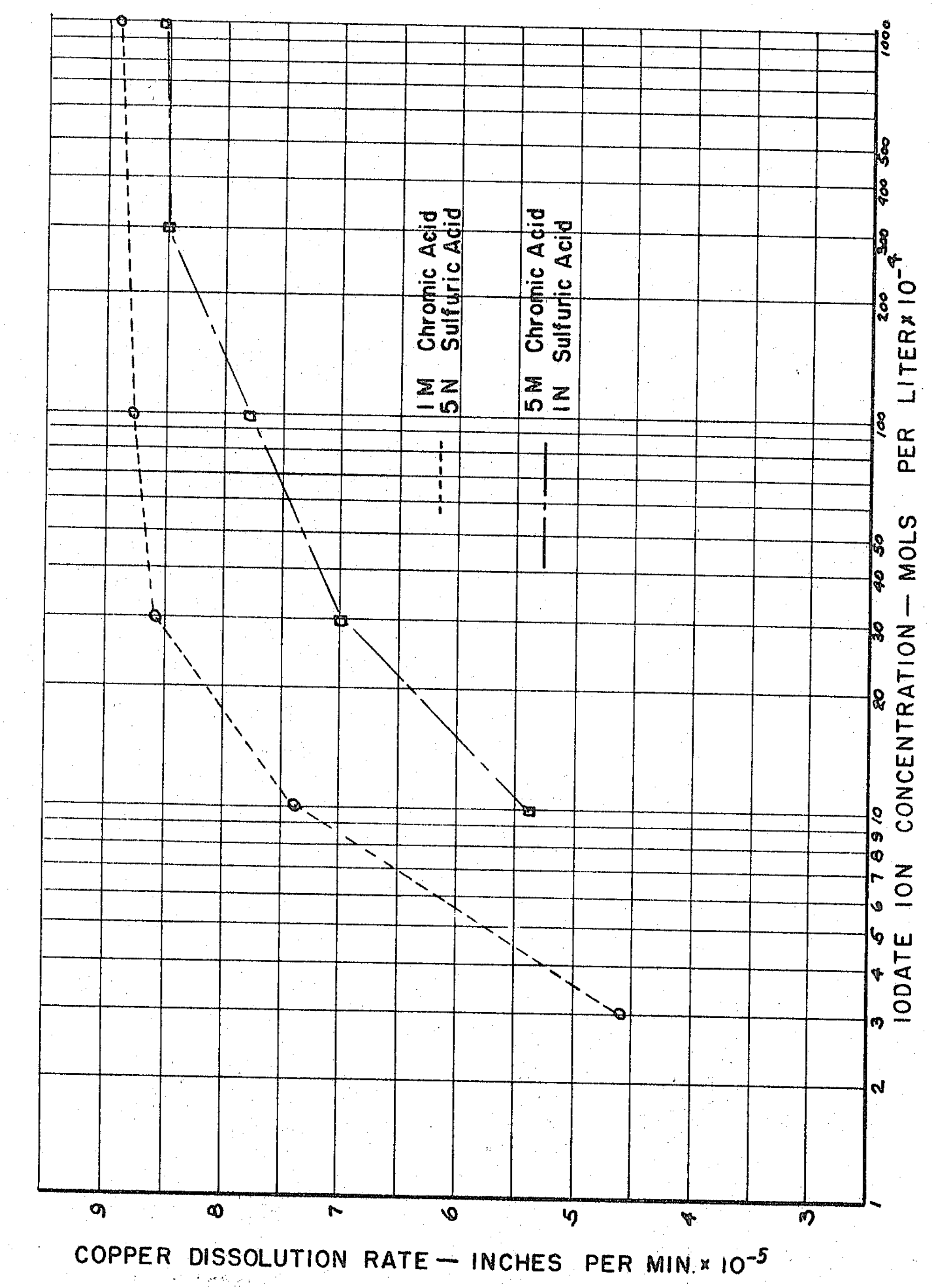
INVENTOR.
Leo J. Slominski
BY Steward & Steward 3,322,673

COMPOSITION FOR AND METHOD OF DISSOLVING COPPER AND COPPER ALLOYS BY CHEMICAL ACTION

Leo J. Slominski, Bristol, Conn., assignor to MacDermid, Incorporated, Waterbury, Conn., a corporation of Connecticut Filed Apr. 1, 1964, Ser. No. 356,405
11 Claims. (Cl. 252—79.2)

This invention relates generally to the dissolution of copper and copper alloys and more especially to dissolution of copper and copper alloy films of the type commonly incorporated in laminated printed circuit boards. The invention is directed more particularly to compositions useful in etching away unwanted portions of the conductive metal film of the laminate in order to form the desired circuitry thereon. With the rapid expansion of the electronic industry in the field of printed circuitry, there is an increasing need for rapid, efficient, easy-to-handle compositions, which are stable in day-to-day use and are selective in their attack on copper and copper alloys.

Many methods of chemically dissolving copper are known to the art, but all of these lack one or more of a number of qualifications that are desired of an etchant composition for printed circuit fabrication. For example, ferric chloride compositions are frequently used in such applications, but such a system severely attacks solder, nickel and gold, all of which materials are commonly used in conjunction with copper in the manufacture of printed circuit components. Accordingly one of the objects of the invention is to provide an etchant which is selective in attacking copper or predominantly copper alloys.

Another frequently used etchant is an aqueous solution of ammonium persulfate. This system has several handicaps. Initially it is rather difficult to activate, requiring the addition of a critical amount of a mercury salt. The presence of mercury is objectionable in the electronic industry in many sensitive applications because of the liability toward formation of an undesirable amalgam of the mercury with copper or gold. Furthermore, ammonium persulfate is intrinsically unstable in the presence of dissolved copper and may undergo spontaneous decomposition, producing hazardous conditions. For this reason day-to-day storage of such persulfate etchants for an economical period of time is effectively prevented. It is accordingly a further object of this invention to provide a completely stable system, and one which at the same time introduces no deleterious components.

A widely used etchant consists of a mixture of chromic acid and sulfuric acid in various proportions. The action of this system is normally rather slow, and the operating temperature must be kept relatively high (80° C.) to get practical results. For this reason the addition of chloride ion is frequently employed as a catalyst to increase the reaction speed. The amount of chloride ion added is minor, but is very critical, and in the strongly oxidizing system is oxidized to free chlorine rather easily with a two-fold effect on the system. First of all, because the chloride is converted to free chlorine this evolves from the solution and the catalytic benefit is rapidly lost. Secondly, the work area becomes intolerable to personnel unless expensive ventilating equipment is provided. Prolonged storage of highly concentrated solutions, as in the case of proprietary formulations, and elevated temperatures, such as outdoor summer storage, a common industrial practice, aggravates the foregoing undesirable effects. Further, chloride-containing chromic-sulfuric acid systems attack nickel and gold when used in conjunction with copper. It is accordingly a further object of the invention to provide a completely stable catalyst for a chromic-sulfuric acid system which will not be oxidized and lost under conditions of normal storage and use, and which, furthermore, will not attack nickel or gold.

In accordance with the present invention, a chromic-sulfuric acid system is employed, which system is catalyzed by the addition of an iodate. The catalyzing ion may be derived from iodic acid or one of its soluble salts such as the sodium, potassium, ammonium or lithium salts. Elemental iodine or a soluble iodide can also serve in the chromic-sulfuric acid system, as oxidation of such iodides to the iodate will take place in solution. But this occurs at the expense of an equivalent amount of chromic acid, for which allowance must accordingly be made.

The optimum concentration of the iodate ion is dependent upon the relative proportions of the chromic and sulfuric acids. A typical chromic-sulfuric acid etchant used commercially as a copper stripping formulation consists of about 4.8 M chromic acid and 1.1 N sulfuric acid. In such solution, the iodate ion becomes an effective catalyst at a concentration of about 0.001 m./l. and increases to an optimum at about 0.03 m./l. When the acid proportions are reversed for greater stripping speeds, for example in a solution of 1 M chromic acid and 5 N sulfuric acid, the iodate becomes effective at a concentration of about 0.0003 m./l. and increases rapidly to an optimum of about 0.003 m./l.

It is to be understood that these are not limiting concentrations for the iodate ion, but rather practical maxima beyond which increases in concentration are accompanied by diminishing improvement in dissolution rate. A graph of iodate ion concentration against copper dissolution rate is shown in FIG. 1, in which curves for the two chromic-sulfuric acid systems above-mentioned are shown. Dissolution rates for other chromic-sulfuric acid relationships can be readily interpolated from these curves. The useful range of concentration for chromic acid is from around 0.5 to 10.0 mols per liter of solution; that of sulfuric acid is from around 0.5 to 10.0 N.

A substantial advantage of the iodate-catalyzed system over the conventional chromic-sulfuric type of etchant is realized in respect to operating temperatures of the solution. As against the typical operating temperature of 80° C. required for effective use of the conventional chromic-sulfuric system, the system of the present invention is fully practical at temperatures on the order of 25° C.

A number of examples are presented hereinafter to illustrate the invention and to provide a comparison of the results with the conventional chromic-sulfuric acid system. It will of course be understood that such examples are by way of illustration only and are not intended to definitively limit the scope of the invention. Such scope is defined more particularly in the accompanying claims.

*Example 1*

A conventional chromic-sulfuric acid solution was prepared consisting of 4.8 M chromic acid and 1.1 N sulfuric acid. A copper laminate of the type normally used in the manufacture of printed circuits was placed in this solution, and the copper foil was dissolved at the rate of 0.000045 inch/minute at 25° C., without agitation. A separate solution was prepared consisting of the same chromic and sulfuric acid concentrations but including 0.03 m./l. of potassium iodate. Again, a copper laminate was placed in this solution under the same conditions of temperature and non-agitation. In the iodate-catalyzed solution the rate of copper dissolution was 0.000082 inch/minute, a rate increase of 82% relative to the uncatalyzed etchant.

*Example 2*

An aqueous solution was prepared consisting of 0.5 M sodium dichromate and 5 N sulfuric acid. This conventional solution exhibited a copper dissolution rate of 0.0000347 inch/minute at 25° C., without agitation. The same acid solution containing in addition 0.003 m./l. of potassum iodate, dissolved copper at the rate of 0.000076 inch/minute under the same conditions, a rate increase of 119%.

*Example 3*

An aqueous solution was prepared consisting of 1.5 M chromic acid and 5 N sulfuric acid. This conventional solution dissolved copper at the rate of 0.000036 inch/minute at 25° C., without agitation. An acid solution identical with this except that it also included 0.003 m./l. of potassium iodide showed a rate of dissolution of the copper of 0.000089 inch/minute under identical conditions, representing a rate increase of 147%.

*Example 4*

An aqueous solution was prepared consisting of 1.5 M chromic acid and 5 N sulfuric acid, to which was added 0.003 m./l. of iodine. This solution dissolved copper at the rate of 0.000086 inch/minute at 25° C. without agitation, representing a rate increase of 139% over the uncatalyzed chromic-sulfuric acid system of the same acid concentrations.

*Example 5*

An aqueous solution was made up according to Example 4, except that the catalyst employed was 0.003 m./l. of iodic acid. This solution dissolved copper at the rate of 0.000092 inch/minute at 25° C. without agitation, a rate increase of 156% over the uncatalyzed solution.

In commercial practice the etchant composition will normally be prepared in the form of a concentrated solution to which water is added to dilute to the appropriate concentration when ready to etch. The invention, however, is applicable to dry formulations which, when subsequently diluted in the proper amount of water, will provide the desired stripping or etching solution. For example, a dry formulation comprising 79% by weight chromic acid, 20% by weight sodium bisulfate and 1% potassium iodate, when dissolved in water at the rate of 5 pounds/gallon, will give a solution similar to Example 1 above. Since there is in such composition a large concentration of sodium ion, a substantial concentration of sodium sulfate will be present which tends to suppress the reaction rate of the composition. By way of comparison between the uncatalyzed chromic acid-sodium bisulfate composition and the catalyzed composition, the former dissolves copper at the rate of about 0.000018 inch/minute at 25° C. without agitation, whereas the composition containing the iodate catalyst increases the dissolution rate to 0.000038 inch/minute, an increase of approximately 111%. Thus the dry composition is entirely operative and for some purposes the advantages of a dry concentrate rather than a solution may offset the disadvantage of lower reaction rate.

As shown in Example 3, the soluble dichromate salts may be substituted for chromic acid in the composition. The normal chromate salts may also be substituted provided sulfuric acid is present in large excess over chromic acid, as in Examples 2 and 3. Here again, however, inert salts will accumulate, having a depressing effect on the activity of the composition.

The acid potassium and lithium salts of sulfuric acid, as well as the acid sodium salt above mentioned, may likewise be employed. Although the ammonium salts are also operative, since the ammonium radical can be oxidized in such strong oxidizing systems to nitrogen, its use should be avoided in the preparation of dry compositions as there is the possibility of an explosive reaction occurring.

The iodate-catalyzed system of this invention is applicable to copper and to alloys predominating in copper, such as brass. The system is not operative as to alloys containing substantial amounts of nickel or gold, nor as to alloys of tin. Because it does not attack the last-mentioned group of metals and alloys, the system can be used on copper base components incorporating gold or nickel elements without damaging those elements, as well as on circuit boards using a solder-resist as a mask for defining the conductive pattern desired without damage to that pattern.

What is claimed is:

1. A solution for dissolving copper and predominantly copper-base alloys free of substantial amounts of gold, nickel, and alloys of tin, consisting essentially of a mixture of chromic and sulfuric acids, wherein the concentration of chromic acid is from about 0.5 to 10.0 mols per liter and the normality of the sulfuric acid is from about 0.5 to 10.0, and a compound providing a small but effective amount of iodate ions in solution to catalyze the dissolution of the metal.

2. A solution as defined in claim 1, wherein the concentration of said iodate ion is from 0.0003 to 0.03 mol per liter.

3. A solution as defined in claim 1, which consists essentially of 4.8 molar chromic acid, 1.1 normal sulfuric acid, and said iodate ion concentration is from about 0.001 to 0.03 mol per liter.

4. A solution as defined in claim 3, wherein said soluble iodate-supplying compound is selected from the group consisting of iodic acid and the sodium, potassium, ammonium and lithium salts thereof, potassium iodide and elemental iodine.

5. A solution as defined in claim 1, which consists essentially of 1.0 molar chromic acid, 5.0 normal sulfuric acid, and said iodate ion concentration is from about 0.0003 to 0.003 mol per liter.

6. A solution as defined in claim 5, wherein said soluble iodate-supplying compound is selected from the group consisting of iodic acid and sodium, potassium, ammonium and lithium salts thereof, potassium iodide and elemental iodine.

7. A solution as defined in claim 1, which consists essentially of 1.5 molar chromic acid, and 5.0 normal sulfuric acid, and said iodate ion concentration is about 0.003 mol per liter.

8. An acid-reacting composition for dissolving copper and predominantly copper-base alloys free of substantial amounts of gold, nickel and alloys of tin, consisting essentially of about 79% by weight of chromic acid, 20% by weight of sodium bisulfate and 1% by weight by potassium iodate.

9. A method of dissolving copper and predominantly copper-base alloys free of substantial amounts of gold, nickel, and alloys of tin, which comprises contacting said metal with a solution consisting essentially of chromic and sulfuric acids wherein the concentration of the chromic acid is from 0.5 to 10.0 mols per liter and that of the sulfuric acid is from 0.5 to 10.0 normal, and a compound providing a small but effective amount of iodate ion in solution to catalyze the dissolution of the metal.

10. A method of dissolving copper as defined in claim 9, wherein said solution is 1.0 molar in respect to chromic acid and 5.0 normal in respect to sulfuric acid, and said iodate ion concentration is from about 0.0003 to 0.003 mol per liter.

11. A method of dissolving copper as defined in claim 9, wherein said solution is 4.8 molar in respect to chromic acid and 1.1 normal in respect to sulphuric acid, and said iodate ion concentration is from about 0.001 to 0.03 mol per liter.

References Cited

UNITED STATES PATENTS

| | | | |
|---|---|---|---|
| 1,471,466 | 10/1923 | Hageman | 252—79.2 |
| 2,872,302 | 2/1959 | Bulan | 252—79.2 |
| 2,944,917 | 7/1960 | Cahne. | |
| 2,978,301 | 4/1961 | Margulies et al. | 252—79.1 |
| 3,057,764 | 10/1962 | La Boda et al. | 156—18 X |
| 3,100,170 | 8/1963 | Levy | 156—18 X |
| 3,137,600 | 6/1964 | Margulies et al. | 252—79.1 X |

FOREIGN PATENTS

| | | |
|---|---|---|
| 675,444 | 7/1952 | Great Britain. |

LEON D. ROSDOL, *Primary Examiner.*

SAMUEL H. BLECH, ALBERT T. MEYERS, *Examiners.*

M. WEINBLATT, *Assistant Examiner.*